Figure 1:
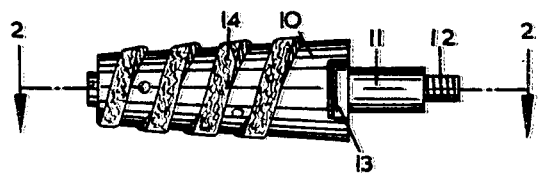

Nov. 3, 1964 J. C. F. DAWKINS 3,154,894
TOOL FOR DRESSING THE SURFACE OF A CONICAL HOLE
Filed Jan. 24, 1961

United States Patent Office 3,154,894
Patented Nov. 3, 1964

3,154,894
TOOL FOR DRESSING THE SURFACE OF A
CONICAL HOLE
John Campbell Francis Dawkins, Staplehurst, Tonbridge,
England, assignor to Diagrit Electrometallics Limited,
Tonbridge, England
Filed Jan. 24, 1961, Ser. No. 84,615
Claims priority, application Great Britain, Oct. 4, 1960,
33,952/60
3 Claims. (Cl. 51—206)

The invention relates to a tool for dressing the surface of a conical hole and it has particular, although not exclusive reference, to a tool for finishing a surface of a conical hole in a work-piece of glass, ceramic or other vitreous material (hereinafter referred to as "glass"). It has hitherto been the practice to dress a conical hole in a glass work-piece by using a tapered tool which has either been completely covered with abradant or provided with parallel axially-directed strips thereof, but these tools have exhibited the disadvantages that they tend during rotation to be drawn into the hole by the taper and in that it is difficult to supply coolant efficiently to the cutting zone. The object of the invention is a tool, whether for dressing a conical hole in a glass or other work-piece, with which these disadvantages are mitigated.

According to the broadest aspect of the invention a tool, for dressing the surface of a conical hole in a work-piece, includes a body portion of circular cross-section and having the same taper angle as the final conical hole, and having at least one abradant land in the form of a spiral helix of opposite hand to the direction in which the tool is to be rotated in operation.

According to a more spacefic aspect of the invention a tool, for dressing the surface of a conical hole in a glass work-piece, includes a metal body portion, of circular cross-section and having the same taper angle as the final conical hole, having at least one abradant land of electro-metallically deposited diamond dust in the form of a spiral helix of opposite hand to the direction in which the tool is to be rotated in operation.

It will be seen that owing to the land being of opposite hand to the direction in which the tool is to be rotated in operation the tool will tend to rise in the taper so as not to bind therein, and the pressure for the cutting operation can be controlled by the feed to the tool.

According to a further feature the tool of the invention has a longitudinal bore which is closed at the operative end of the tool and communicates with at least one radial duct which breaks through the outer surface of the body in a position intermediate successive turns of the land (or lands, as appropriate) for conveying a supply of coolant to the cutting zone. It will be seen that by virtue of the land being of opposite hand to the direction in which the tool is to be rotated in operation the underside of the land (or lands, as appropriate) will tend to force the coolant towards the bottom of the conical hole being dressed while the space between the lands, being of a progressively increasing diameter from the inner, to the outer end of the hole, provides a ready return path for the coolant to carry away the particles cut by the tool.

Figure 2:
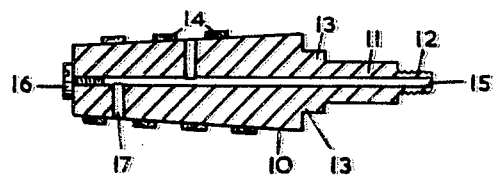

In the accompanying drawings:
FIGURE 1 is a side elevation of one form of tool in accordance with the invention, and provided with one abrasive land;
FIGURE 2 is a longitudinal section on the line 2—2 of FIGURE 1, and
FIGURE 3 is a view like FIGURE 1 but shows the tool provided with more than one abrasive land.

Referring to FIGURES 1 and 2, the tool includes a tapered body portion 10 of metal (e.g., steel) having a shank 11 with a screw-threaded end 12 by which it is to be secured coaxially to a driven shaft (not shown). The body portion 10 is provided with flats 13, 13 for engagement by a spanner for effecting the connection between the tool and the shaft.

Figure 3:
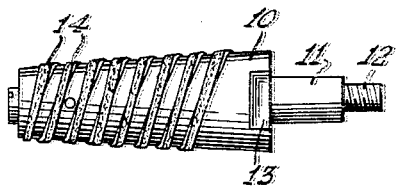

In the example shown, one land of electrometalically deposited diamond dust, shown as of grossly exaggerated depth for the sake of illustration, is applied to the body portion 10 as shown at 14, but it should be understood that more than one such land could be used instead as shown by FIGURE 3. The diamond dust may be electrometallically deposited in the manner described in U.S. Patent No. 2,360,798, granted October 17, 1944 to Seligman et al. The land shown in all the figures is a left-handed spiral helix, the tool being adapted to be rotated clockwise in use (e.g., when viewed from the right-hand side of FIGURE 1).

Referring to FIGURE 2 it will be seen that the whole tool is provided with a longitudinal bore 15 which, at the inner end of the tool, is closed by a screw 16. At axially spaced positions along its length the bore 15 communicates with radial ducts 17 which break through the surface of the body 10 in positions intermediate the turns of the land 14. It is arranged for a supply of coolant (e.g., water) to be fed to the outer end of the bore 15, and, due to the land being of opposite hand to the direction in which the tool is to be rotated in use, the under surfaces of the land will cause the coolant to be urged towards the bottom of the conical hole being dressed, whereby effectively to cool the whole of the cutting zone, whereas at the same time the space between the turns of the land, being of an increasing diameter from the inner to the outer end of the tool, provides a ready path for the coolant to carry away the particles produced by the cutting operation.

What I claim as my invention and desire to secure by Letters Patent of the United States is:

1. A rotary tool for dressing the surface of a conical hole in a vitreous work-piece comprising a body portion of circular cross-section, said body portion being conical with the paper towards its operative end, the taper being at the same angle as the final conical hole in the work-piece is to have, an abradant land of diamond dust integral with said body, said abradant land being in the form of a spiral helix the winding of which is in the direction so that when said tool is rotated, the helix will be rotated in its unscrewing direction so that binding of the tool in the work-piece is avoided and a flow of the ground particles away from the cutting zone is promoted, said tool having a longitudinal bore, said bore closed at the operative end of the tool and adapted at its other end to receive a supply of a coolant, and said tool provided with a duct leading from said bore to a part of the outer conical surface of said tool circumferentially spaced from said land for conveying the coolant to the cutting zone.

2. A rotary tool for dressing the surface of a conical hole in a vitreous work-piece comprising a body portion of circular cross-section, said body portion being conical with the taper towards its operative end, the taper being at the same angle as the final conical hole in the work-piece is to have, a plurality of abradant lands of diamond dust integral with said body, said abradant lands being in the form of equi-circumferentially spaced parallel spiral helices, the windings of which are in the direction so that when the tool is rotated the helices will be rotated in their unscrewing direction so that binding of the tool in the work-piece is avoided and a flow of the ground particles away from the cutting zone is promoted, said tool having a longitudinal bore, said bore closed at the operative end of the tool and adapted at its other end to receive a supply of coolant, and said tool provided with respective ducts leading from said bore to parts of the outer conical surface of said tool circumferentially intermediate said lands for conveying the coolant to the cutting zone.

3. A rotary tool for dressing the surface of a conical hole in a vitreous work-piece comprising a body portion of circular cross-section, said body portion being conical with the taper toward its operative end and extending longitudinally throughout substantially the entire length of its working surface, the taper being at the same angle as the final conical hole in the work-piece is to have, and a plurality of abradant lands of diamond dust integral with said body, said abradant lands being in the form of equi-circuferentially spaced parallel spiral helices, the windings of which are in the direction so that when the tool is rotated the helices will be rotated in their unscrewing direction so that binding of the tool in the work-piece is avoided and a flow of the ground particles away from the cutting zone is promoted, said tool having a longitudinal bore, said bore being closed at the operative end of the tool and adapted at its other end to receive a supply of coolant, and said tool being provided with respective ducts leading from said bore to parts of the outer conical surface of said tool circumferentially intermediate said lands for conveying the coolant to the cutting zone.

References Cited by the Examiner
UNITED STATES PATENTS

| | | | |
|---|---|---|---|
| 220,911 | 10/79 | Cogswell | 51—206 |
| 1,915,016 | 6/33 | Diffenderffer | 51—206 |
| 2,360,798 | 10/44 | Selgiman et al. | 204—16 |
| 2,383,464 | 8/45 | Bown | 51—206 |
| 2,887,276 | 5/59 | Minarik | 51—267 XR |
| 2,978,846 | 4/61 | Barron | 51—206 |

J. SPENCER OVERHOLSER, *Primary Examiner.*
FRANK E. BAILEY, FRANK H. BRONAUGH, JOHN C. CHRISTIE, *Examiners.*